(12) United States Patent
Oh (10) Patent No.: US 10,766,327 B2
(45) Date of Patent: Sep. 8, 2020

(54) MULTI-PLATE SPRING SUSPENSION OF COMPOSITE MATERIAL FOR VEHICLE

(71) Applicants: Hyundai Motor Company, Seoul (KR); Kia Motors Corporation, Seoul (KR)

(72) Inventor: Seung Hyun Oh, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 174 days.

(21) Appl. No.: 16/179,958

(22) Filed: Nov. 4, 2018

(65) Prior Publication Data
US 2019/0389266 A1    Dec. 26, 2019

(30) Foreign Application Priority Data

Jun. 21, 2018 (KR) .................. 10-2018-0071398

(51) Int. Cl.
| | |
|---|---|
| *B60G 11/46* | (2006.01) |
| *B60G 11/38* | (2006.01) |
| *F16F 1/26* | (2006.01) |
| *F16F 1/28* | (2006.01) |
| *F16F 1/30* | (2006.01) |
| *F16F 1/368* | (2006.01) |

(52) U.S. Cl.
CPC ............... B60G 11/38 (2013.01); F16F 1/26 (2013.01); F16F 1/28 (2013.01); F16F 1/30 (2013.01); *B60G 2202/112* (2013.01); *B60G 2204/12* (2013.01); *B60G 2204/121* (2013.01); *B60G 2206/7101* (2013.01); *F16F 1/3686* (2013.01)

(58) Field of Classification Search
CPC ...... F16F 1/027; F16F 1/26; F16F 1/28; F16F 1/30; F16F 1/368; F16F 1/3683; F16F 1/3686; F16F 3/023; B60G 11/02; B60G 11/10; B60G 11/113; B60G 11/12; B60G 11/34; B60G 11/38; B60G 11/40; B60G 11/42; B60G 2204/12; B60G 2204/121
See application file for complete search history.

(56) References Cited

U.S. PATENT DOCUMENTS

| | | | | |
|---|---|---|---|---|
| 2006/0061021 | A1* | 3/2006 | Dittmar | F16F 1/26 |
| | | | | 267/47 |
| 2006/0244234 | A1* | 11/2006 | Ramsey | B60G 5/047 |
| | | | | 280/124.131 |
| 2006/0249923 | A1* | 11/2006 | Ramsey | B60G 11/46 |
| | | | | 280/124.131 |
| 2007/0278759 | A1* | 12/2007 | Reineck | B60G 9/003 |
| | | | | 280/124.116 |

(Continued)

FOREIGN PATENT DOCUMENTS

| | | |
|---|---|---|
| KR | 101462239 B1 | 11/2014 |
| KR | 101750298 B1 | 6/2017 |

*Primary Examiner* — Nicholas J Lane
(74) *Attorney, Agent, or Firm* — Mintz Levin Cohn Ferris Glovsky and Popeo, P.C.; Peter F. Corless (57) ABSTRACT

A multi-plate spring suspension of composite material for a vehicle includes: a first bracket unit mounted to a rubber spring; a second bracket unit mounted to a trunnion base; and a plurality of composite springs manufactured by impregnating reinforcing fibers with resin, coupled to the first bracket unit and the second bracket unit at opposite ends thereof, respectively, and being vertically spaced apart from each other.

14 Claims, 4 Drawing Sheets

(56) References Cited

U.S. PATENT DOCUMENTS

| | | | |
|---|---|---|---|
| 2008/0252033 A1* | 10/2008 | Platner | B60G 11/10 |
| | | | 280/124.163 |
| 2011/0095456 A1* | 4/2011 | Kanematsu | F16F 1/20 |
| | | | 267/47 |
| 2012/0200057 A1* | 8/2012 | Juriga | B60G 11/12 |
| | | | 280/124.116 |
| 2018/0172100 A1* | 6/2018 | Jang | F16F 1/3683 |
| 2018/0281541 A1* | 10/2018 | Berlingieri | B60G 11/113 |
| 2019/0009628 A1* | 1/2019 | Oh | F16F 1/30 |
| 2019/0017882 A1* | 1/2019 | Oh | G01L 5/22 |
| 2019/0047344 A1* | 2/2019 | Kim | B60G 11/08 |

* cited by examiner

MULTI-PLATE SPRING SUSPENSION OF COMPOSITE MATERIAL FOR VEHICLE

CROSS REFERENCE TO RELATED APPLICATION

The present application claims under 35 U.S.C. § 119(a) the benefit of Korean Patent Application No. 10-2018-0071398 filed Jun. 21, 2018, the entire contents of which are incorporated by reference herein.

BACKGROUND

(a) Technical Field

The present disclosure relates generally to a multi-plate spring suspension of composite material for a vehicle, more particularly, to the multi-plate spring suspension capable of elastically mediating between a vehicle body and an axle using composite springs.

(b) Description of the Related Art

Generally, in commercial vehicles, a leaf spring is connected between two axle shafts to elastically mediate between a trunnion base and the axle shafts.

Conventionally, when a suspension structure using a leaf spring made of metal material is used, a windup phenomenon occurs in which opposite leaf springs based on the trunnion base rotate in opposite directions when the vehicle is suddenly stopped. If a windup phenomenon occurs, the vehicle body is severely tilted in the forward direction, or the load is concentrated on the spring and the vehicle body, resulting in breakage.

Meanwhile, a technique has been developed in which the conventional leaf spring of metal material is replaced with a spring of composite material with reinforcing fibers impregnated with resin. The composite spring is light in weight, which helps to lighten the vehicle, and is superior in tensile strength and elasticity, so it can replace the conventional leaf spring.

However, it is difficult to use the bolting method due to the material properties of the composite spring, and it is difficult to apply the bolted multi-layer structure like the leaf spring because the composite spring is easily damaged by friction.

Therefore, one composite spring is used to replace a leaf spring of multi-plate type, and if the composite spring is damaged, running of the vehicle is impossible.

Accordingly, a suspension structure is required that uses a composite spring of a multi-plate type that can support the vehicle body by another composite spring even if one composite spring is broken while preventing breakage due to bolting or friction.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a multi-plate spring suspension of composite material, the spring suspension having multiple composite springs, thus allowing a vehicle to run even if one of the multiple composite springs is broken.

In order to achieve the above object, there is provided a multi-plate spring suspension of composite material, the spring suspension including: a first bracket unit mounted to a rubber spring; a second bracket unit mounted to a trunnion base; and a plurality of composite springs coupled to the first bracket unit and the second bracket unit at opposite ends thereof, respectively, and being vertically spaced apart from each other.

The composite springs may include an upper spring and a lower spring, the first bracket unit may include: a first upper bracket coupled to a first end portion of the upper spring; and a first lower bracket connected to a lower portion of the first upper bracket to be coupled to a first end portion of the lower spring, and the second bracket unit may include: a second upper bracket coupled to a second end portion of the upper spring; and a second lower bracket coupled to a second end portion of the lower spring.

The first upper bracket may include: a first upper plate provided to be in contact with an upper surface of the first end portion of the upper spring; a first lower plate spaced below the first upper plate to be in contact with a lower surface of the first end portion of the upper spring; and a first side plate configured to connect the first upper plate and the first lower plate to each other, and the first lower bracket may include: a second upper plate provided to be in contact with an upper surface of the first end portion of the lower spring; a second lower plate spaced below the second upper plate to be in contact with a lower surface of the first end portion of the lower spring; and a second side plate configured to connect the second upper plate and the second lower plate to each other.

The first bracket unit may further include a connecting member connecting the first upper bracket and the first lower bracket to each other, and the connecting member may be configured to couple the first side plate and the second side plate together to connect the first upper bracket and the first lower bracket to each other.

The first side plate may be configured to protrude downward from the first lower plate and be in contact with an upper surface of the second side plate, and a connecting member may be configured to couple the first side plate and the second side plate together by vertically penetrating through the first side plate and the second side plate.

The rubber spring may be provided at an upper end thereof with a rubber spring bracket being in contact with a lower surface of the first lower bracket, and a lower end of the connecting member may connect the first lower bracket and the rubber spring to each other by penetrating through the rubber spring bracket.

The first bracket unit may further include: a first fixing member configured to sequentially penetrate through the first upper plate, the upper spring, and the first lower plate to fix the first end portion of the upper spring to the first upper bracket; and a second fixing member configured to sequentially penetrate through the second upper plate, the lower spring, and the second lower plate to fix the first end portion of the lower spring to the first lower bracket.

The second bracket unit may further include a support being coupled to the trunnion base and extending upward and downward, the second upper bracket may include: a third upper plate extending from the support to be in contact with an upper surface of the second end portion of the upper spring; and a third lower plate being spaced below the third upper plate and extending from the support to be in contact with a lower surface of the second end portion of the upper spring, and the second lower bracket may include: a fourth upper plate being spaced below the third lower plate and extending from the support to be in contact with an upper surface of the second end portion of the lower spring; and a fourth lower plate being spaced below the fourth upper plate and extending from the support to be in contact with a lower surface of the second end portion of the lower spring.

The second bracket unit may further include: a third fixing member configured to sequentially penetrate through the third upper plate, the upper spring, and the third lower plate to fix the second end portion of the upper spring to the second upper bracket; and a fourth fixing member configured to sequentially penetrate through the fourth upper plate, the lower spring, and the fourth lower plate to fix the second end portion of the lower spring to the second lower bracket.

The rubber spring may be configured such that a pair of rubber springs is provided to be mounted at opposite sides of the trunnion base, respectively, the first bracket unit may be configured such that a pair of first bracket units is provided to be mounted to the rubber springs, respectively, and the composite springs may be provided between the first bracket unit and the second bracket unit.

The composite springs may be divided into opposite end portions coupled to the first bracket unit and the second bracket unit, respectively, and a middle portion formed therebetween, and a width of the opposite end portions in a vehicle width direction may be smaller than a width of the middle portion in the vehicle width direction.

The composite springs may be manufactured by impregnating reinforcing fibers with resin.

The reinforcing fibers included in an upper spring and a lower spring may include a plurality of first fibers arranged perpendicular to the vehicle width direction.

The reinforcing fibers included in the lower spring may further include a plurality of second fibers arranged to cross the first fibers.

The multi-plate spring suspension of composite material according to the present disclosure has the following advantages.

First, the spring suspension includes multiple composite springs, thereby enabling the vehicle to run even if one of the multiple composite springs is broken.

Second, by preventing friction between composite springs, life span thereof can be increased.

Third, by shortening the lengths of the composite springs, it is possible to improve durability of the springs and is possible to prevent a windup phenomenon.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, a multi-plate spring suspension of composite material according to exemplary embodiments of the present disclosure will be described in more detail with reference to the accompanying drawings.

Figure 1:
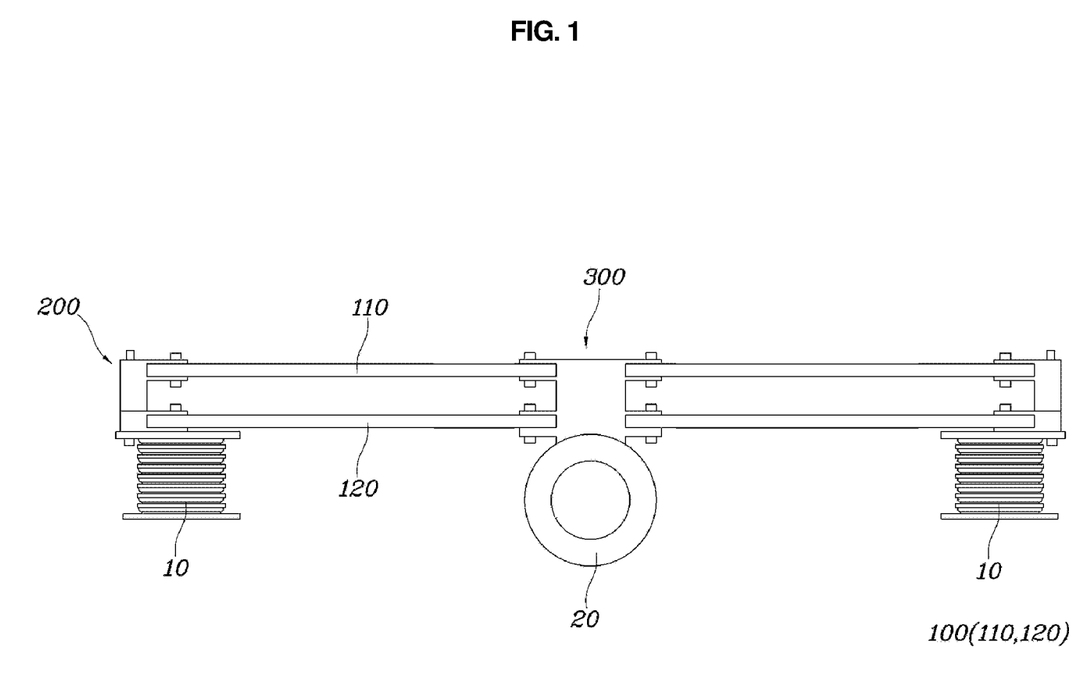
FIG. 1 is a side view showing a multi-plate spring suspension of composite material according to an embodiment of the present disclosure.
Figure 2:
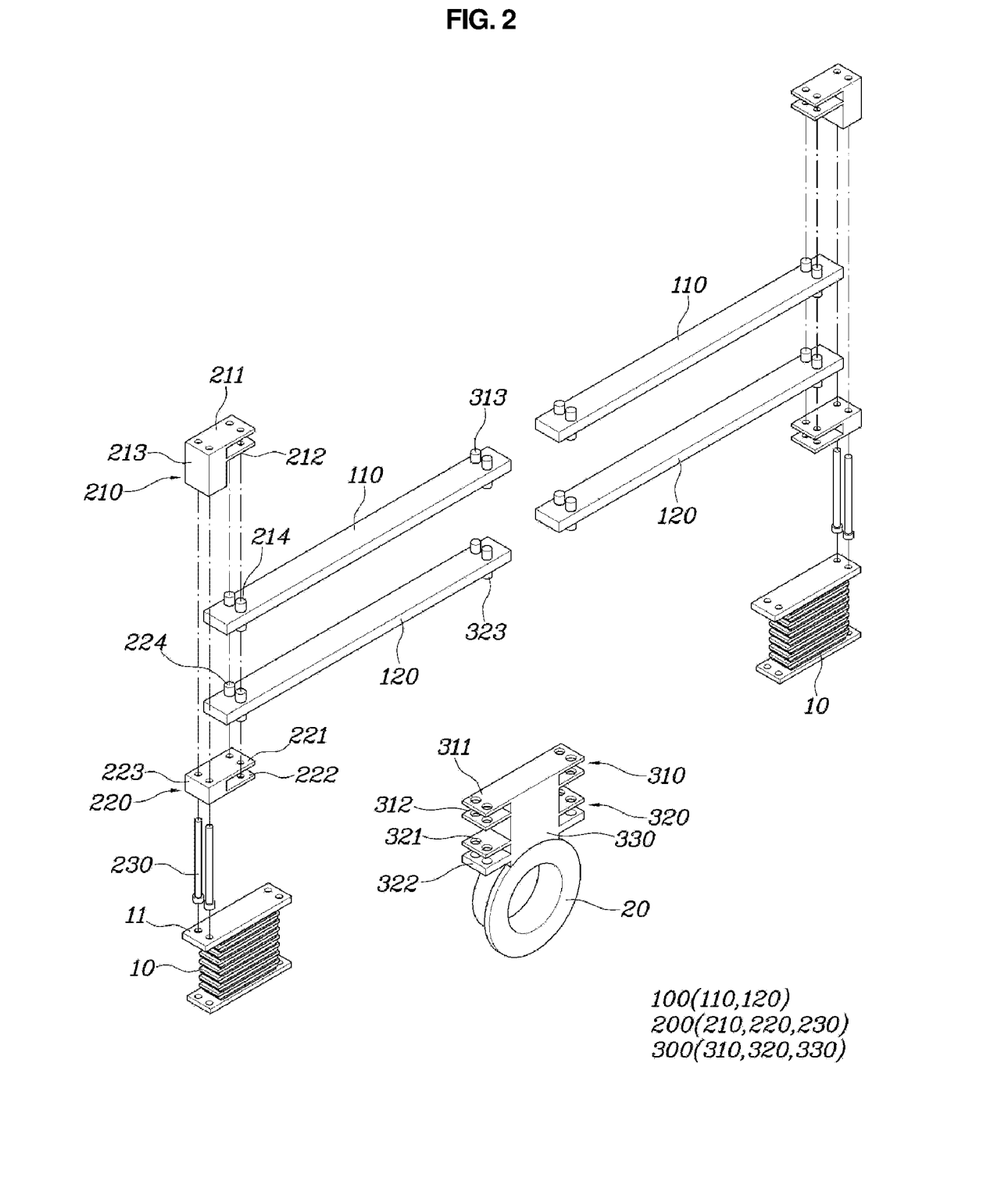
FIG. 2 is an exploded perspective view showing the multi-plate spring suspension of composite material according to the embodiment of the present disclosure.

FIG. 1 is a side view showing a multi-plate spring suspension of composite material according to an embodiment of the present disclosure; FIG. 2 is an exploded perspective view showing the multi-plate spring suspension of composite material according to the embodiment of the present disclosure; and FIG. 3 is a perspective view showing the multi-plate spring suspension of composite material according to the embodiment of the present disclosure.

Figure 3:
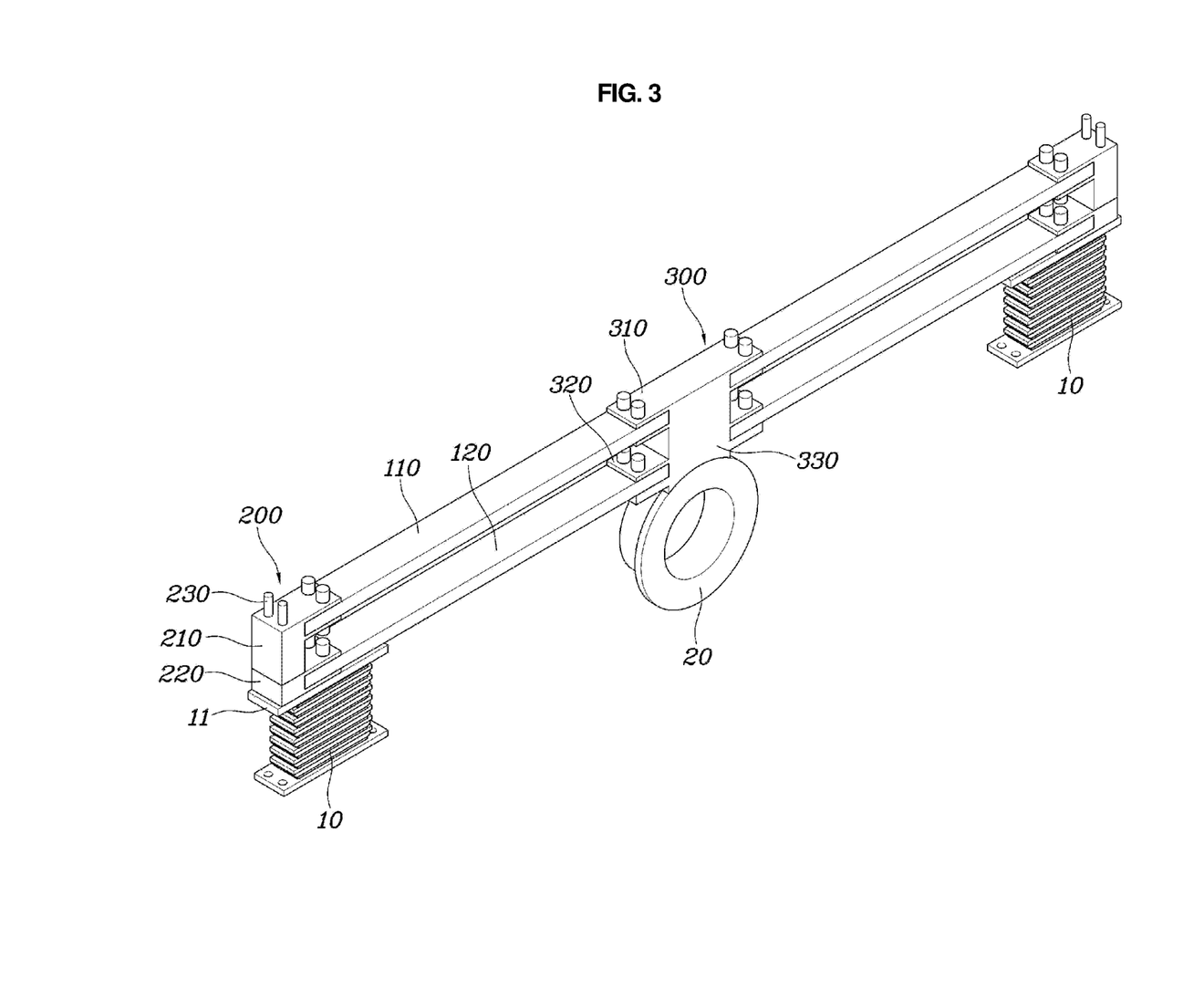
FIG. 3 is a perspective view showing the multi-plate spring suspension of composite material according to the embodiment of the present disclosure.

As shown in FIGS. 1 to 3, an embodiment of a multi-plate spring suspension of composite material according to the present disclosure includes: a first bracket unit 200 mounted to a rubber spring 10; a second bracket unit 300 mounted to a trunnion base 20; and a plurality of composite springs 100 manufactured by impregnating reinforcing fibers with resin, with opposite ends thereof being coupled to the first bracket unit 200 and the second bracket unit 300, respectively, and being vertically spaced apart from each other.

The rubber spring 10 mentioned here is installed on an axle shaft of a commercial vehicle to elastically absorb impact transmitted from the ground, and the trunnion base 20 is configured to evenly distribute the load of the vehicle body to each axle shaft.

The composite springs 100 are manufactured by impregnating reinforcing fibers with resin. Here, it is preferred that the reinforcing fibers are arranged in a predetermined direction so as to be of an anisotropic type having enhanced rigidity in a specific direction.

Each of the first bracket unit 200 and the second bracket unit 300 is formed with a groove so as to accommodate opposite ends of the composite springs 100 therein and couple that same together.

Here, the first bracket unit 200 and the second bracket unit 300 are formed with a plurality of grooves, with each of the composite springs 100 inserted therein, whereby a plurality of the composite springs 100 can connect between the first bracket unit 200 and the second bracket unit 300 while being spaced apart from each other. For example, the composite springs 100 may include an upper spring 110 and a lower spring 120.

The first bracket unit 200 may be roughly divided into a first upper bracket 210 and a first lower bracket 220, and the first upper bracket 210 and the first lower bracket 220 may be integrally formed by being connected to each other through a connecting member 230.

The first upper bracket 210 is formed with a groove with a first end portion of the upper spring 110 inserted therein, and the first lower bracket 220 is formed with a groove with a first end portion of the lower spring 120 inserted therein.

In particular, the first upper bracket 210 includes a first upper plate 211, a first lower plate 212, and a first side plate 213, wherein the first upper plate 211 is provided to be in contact with an upper side surface of the first end portion of the upper spring 110, the first lower plate 212 is provided to be in contact with a lower side surface of the first end portion of the upper spring 110, and the first side plate 213 connects end portions of the first upper plate 211 and the first lower plate 212 together. Thereby, the first upper bracket 210 is formed to be a U-shaped groove as a whole, into which the first end portion of the upper spring 110 is inserted.

Here, the lower end of the first side plate 213 is configured to protrude lower than the first lower plate 212, and the first side plate 213 is formed with a through-hole therein. The inner side of the through-hole may be formed with threads. As the first side plate 213 protrudes downward from the first lower plate 212, the first upper bracket 210 can be formed in an F-shape.

The first lower bracket 220 includes a second upper plate 221, a second lower plate 222, and a second side plate 223, wherein similar to the first upper bracket 210, the second upper plate 221 is provided to be in contact with an upper side surface of the first end portion of the lower spring 120, the second lower plate 222 is provided to be in contact with a lower side surface of the first end portion of the lower spring 120, and the second side plate 223 connects end portions of the second upper plate 221 and the second lower plate 222. Thereby, the first lower bracket 220 is formed to be a U-shaped groove as a whole, and the first end portion of the lower spring 120 is inserted thereinto.

The upper end of the second side plate 223 is formed to be in close contact with the lower end of the first side plate 213, and the second side plate 223 is provided with a through-hole vertically formed therein to communicate with the through-hole of the first side plate 213.

The connecting member 230 penetrates through the through-holes of the first side plate 213 and the second side plate 223 simultaneously to connect the first side plate 213 and the second side plate 223, thereby coupling the first upper bracket 210 and the first lower bracket 220 together. The connecting member 230 may be a bolt or a rivet, and when the connecting member 230 is a bolt, may be fastened with the threads formed on the inner sides of the through-holes of the first side plate 213 and the second side plate 223.

Here, since the first side plate 213 protrudes lower than the first lower plate 212, the grooves respectively formed in the first upper bracket 210 and a second lower bracket 320 are formed to be spaced apart from each other, whereby the upper spring 110 and the lower spring 120 can be maintained spaced apart from each other at a predetermined interval.

Meanwhile, the upper end of the rubber spring 10 is formed with a rubber spring bracket 11 being in contact with the lower surface of the first lower bracket 220, and the rubber spring bracket 11 is formed with a through-hole communicating with the through-hole formed in the first side plate 213, whereby the lower end portion of the connecting member 230 penetrates through the through-hole formed in the rubber spring bracket 11 to integrally fix the first lower bracket 220 and the rubber spring 10.

Thereby, the first bracket unit 200 is fixed to the rubber spring 10 so that the first end portions of the upper spring 110 and the lower spring 120 can be coupled to the upper end of the rubber spring 10.

In addition, it is preferred that the first bracket unit 200 further includes: a first fixing member 214 sequentially penetrating through the first upper plate 211, the first end portion of the upper spring 110, and the first lower plate 212 sequentially to fix the upper spring 110 to the first upper bracket 210; and a second fixing member 224 sequentially penetrating through the second upper plate 221, the first end portion of the lower spring 120, and the second lower plate 222 to fix the lower spring 120 to the first lower bracket 220.

The first fixing member 214 and the second fixing member 224 are preferably provided as a huck bolt or rivet to fasten the first end portion of the upper spring 110 to the first upper bracket 210, and to fasten the first end portion of the lower spring 120 to the first lower bracket 220.

The second bracket unit 300 may be divided into: a second upper bracket 310 coupled to a second end portion of the upper spring 110; the second lower bracket 320 coupled to a second end portion of the lower spring 120; and a support 330 coupled to the trunnion base 20 to support the second upper bracket 310 and the second lower bracket 320.

The second upper bracket 310 includes: a third upper plate 311 laterally extending from the upper end of the support 330 to be in contact with an upper side surface of the second end portion of the upper spring 110; and a third lower plate 312 extending from the side surface of the support 330 while being spaced below the third upper plate 311 to be in contact with a lower side surface of the second end portion of the upper spring 110.

Similar to the second upper bracket 310, the second lower bracket 320 includes: a fourth upper plate 321 extending from the side surface of the support 330 while being spaced below the third lower plate 312 to be in contact with an upper side surface of the second end portion of the lower spring 120; and a fourth lower plate 322 extending from the side surface of the support 330 while being spaced below the fourth upper plate 321 to be in contact with a lower side surface of the second end portion of the lower spring 120.

Meanwhile, the support 330 is provided at the upper portion of the trunnion base 20 to have a block shape having a predetermined height, and the support 330 and the trunnion base 20 may be welded together, fastened together by a coupling member such as a bolt, or integrally molded and provided as a single body.

Preferably, the second bracket unit 300 further includes: a third fixing member 313 configured to sequentially penetrate through the third upper plate 311, the upper spring 110, and the third lower plate 312 to fix the second end portion of the upper spring 110 to the second upper bracket 310; and a fourth fixing member 323 configured to sequentially penetrate through the fourth upper plate 321, the lower spring 120, and the fourth lower plate 322 to fix the second end portion of the lower spring 120 to the second lower bracket 320.

The third fixing member 313 and the fourth fixing member 323 are preferably provided as a huck bolt or rivet.

The position where each of the first fixing member 214, the second fixing member 224, the third fixing member 313, and the fourth fixing member 323 described above penetrates through each bracket and spring may be, for example, in the case of the first fixing member 214, a predetermined distance, for example, 5 mm inside from the ends of the first upper plate 211 and the first lower plate 212. In other words, the first upper plate 211 and the first lower plate 212 are in close contact with and fixed to the upper and lower side surfaces of the upper spring 110 respectively outwardly from the position where the first fixing member 214 penetrates, whereby it is possible to prevent the problem that the upper spring 110 is broken due to cracking in the through-hole of the upper spring 110 by the first fixing member 214.

Likewise, the second fixing member 224, the third fixing member 313, and the fourth fixing member 323 may be formed to have the same structure to prevent cracking at opposite ends of the upper spring 110 and the lower spring 120.

Meanwhile, the rubber spring 10 may be respectively installed in opposite directions of the trunnion base 20, that is, in the forward and backward directions of the vehicle, and an axle shaft may be coupled to the lower end of each rubber spring 10. In this case, each of the upper spring 110 and the lower spring 120 is provided in pair. For example, one upper spring 110 may be coupled to a rubber spring 10 installed in the forward direction of the vehicle based on trunnion base 20, and the other upper spring 110 may be coupled to a rubber spring 10 installed in the backward direction of the vehicle based on trunnion base 20.

Thereby, it is possible to prevent the problem encountered in the prior art of a vehicle being unmovable in the event of damage to a conventional composite spring. In contrast, according to the claimed invention, even if any one of the composite springs 100 is damaged, it is still possible to drive the vehicle.

Figure 4:
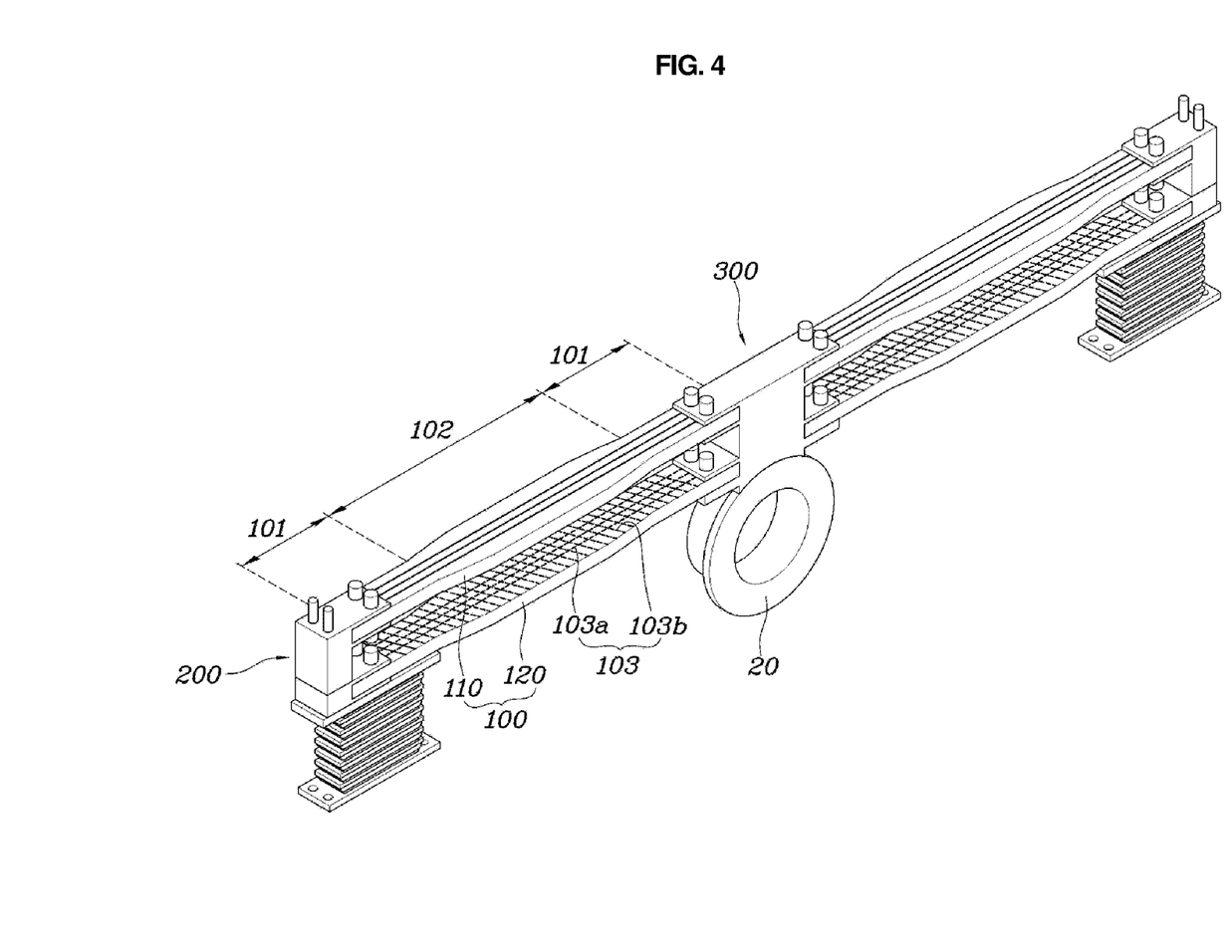
FIG. 4 is a perspective view showing a multi-plate spring suspension of composite material according to another embodiment of the present disclosure.

Meanwhile, as shown in FIG. 4, in another embodiment of the multi-plate spring suspension of composite material according to the present disclosure, the shape of the composite springs 100 may be different from the first embodiment.

The composite springs 100 may be divided into: opposite end portions 101 coupled to both the first bracket unit 200 and the second bracket unit 300; and a middle portion 102 formed therebetween, wherein a width of the opposite end portions 101 in the vehicle width direction may be formed to be smaller than that of the middle portion 102 in the vehicle width direction.

This is to compensate the problem that the lateral modulus of elasticity is lowered due to the characteristics of the composite springs 100. When the width of the middle portion 102 in the vehicle width direction is increased, the resistance to lateral load and torsional load generated during cornering and rolling behavior of the vehicle body shaking to the left and right is increased.

Meanwhile, reinforcing fibers 103 are inserted into the composite springs 100, wherein the reinforcing fibers 103 preferably include first fibers 103a arranged to be essentially perpendicular to the front-rear direction of the vehicle, i.e., the vehicle width direction.

This is because the direction of the main load applied to the composite springs 100 is the front-rear direction, so the rigidity in the longitudinal direction, that is, in the front-rear direction and in the vertical direction, can be increased through the first fibers 103a.

Meanwhile, in addition to the first fibers 103a, it is preferred that the lower spring 120 of the composite springs 100 further includes second fibers 103b arranged to cross the first fibers 103a.

This is because a larger load is applied to the lower spring 120 compared to the upper spring 110 when lateral load and torsional load are applied, and thus it is required to improve lateral rigidity of the lower spring 120.

Accordingly, the second fibers 103b are arranged in an oblique line inclined at an angle of, for example, 45° with respect to the arrangement direction of the first fibers 103a, whereby it is possible to improve the lateral rigidity of the lower spring 120.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

Therefore, preferred embodiments of the present disclosure have been described for illustrative purposes, and should not be construed as being restrictive. The scope of the present disclosure is defined by the accompanying claims rather than the description which is presented above. Moreover, the present disclosure is intended to cover not only the exemplary embodiments, but also various alternatives, modifications, equivalents and other embodiments that may be included within the spirit and scope of the present disclosure as defined by the appended claims.

What is claimed is:

1. A multi-plate spring suspension of composite material for a vehicle, the spring suspension comprising:
   a first bracket unit mounted to a rubber spring;
   a second bracket unit mounted to a trunnion base; and
   a plurality of composite springs coupled to the first bracket unit and the second bracket unit at opposite ends thereof, respectively, the composite springs being vertically spaced apart from each other.

2. The spring suspension of claim 1, wherein:
   the composite springs include an upper spring and a lower spring,
   the first bracket unit includes: a first upper bracket coupled to a first end portion of the upper spring; and a first lower bracket connected to a lower portion of the first upper bracket to be coupled to a first end portion of the lower spring, and the second bracket unit includes: a second upper bracket coupled to a second end portion of the upper spring; and a second lower bracket coupled to a second end portion of the lower spring.

3. The spring suspension of claim 2, wherein:

the first upper bracket includes: a first upper plate provided to be in contact with an upper surface of the first end portion of the upper spring; a first lower plate spaced below the first upper plate to be in contact with a lower surface of the first end portion of the upper spring; and a first side plate configured to connect the first upper plate and the first lower plate to each other, and the first lower bracket includes: a second upper plate provided to be in contact with an upper surface of the first end portion of the lower spring; a second lower plate spaced below the second upper plate to be in contact with a lower surface of the first end portion of the lower spring;

and a second side plate configured to connect the second upper plate and the second lower plate to each other.

4. The spring suspension of claim 3, wherein:

the first bracket unit further includes a connecting member connecting the first upper bracket and the first lower bracket to each other, and the connecting member is configured to couple the first side plate and the second side plate together to connect the first upper bracket and the first lower bracket to each other.

5. The spring suspension of claim 3, wherein:

the first side plate is configured to protrude downward from the first lower plate and be in contact with an upper surface of the second side plate, and a connecting member is configured to couple the first side plate and the second side plate together by vertically penetrating through the first side plate and the second side plate.

6. The spring suspension of claim 5, wherein:

the rubber spring is provided at an upper end thereof with a rubber spring bracket being in contact with a lower surface of the first lower bracket, and a lower end of the connecting member connects the first lower bracket and the rubber spring to each other by penetrating through the rubber spring bracket.

7. The spring suspension of claim 3, wherein the first bracket unit further includes:

a first fixing member configured to sequentially penetrate through the first upper plate, the upper spring, and the first lower plate to fix the first end portion of the upper spring to the first upper bracket; and a second fixing member configured to sequentially penetrate through the second upper plate, the lower spring, and the second lower plate to fix the first end portion of the lower spring to the first lower bracket.

8. The spring suspension of claim 2, wherein:

the second bracket unit further includes a support being coupled to the trunnion base and extending upward and downward, the second upper bracket includes: a third upper plate extending from the support to be in contact with an upper surface of the second end portion of the upper spring; and a third lower plate being spaced below the third upper plate and extending from the support to be in contact with a lower surface of the second end portion of the upper spring, and the second lower bracket includes: a fourth upper plate being spaced below the third lower plate and extending from the support to be in contact with an upper surface of the second end portion of the lower spring; and a fourth lower plate being spaced below the fourth upper plate and extending from the support to be in contact with a lower surface of the second end portion of the lower spring.

9. The spring suspension of claim 8, wherein the second bracket unit further includes:

a third fixing member configured to sequentially penetrate through the third upper plate, the upper spring, and the third lower plate to fix the second end portion of the upper spring to the second upper bracket; and a fourth fixing member configured to sequentially penetrate through the fourth upper plate, the lower spring, and the fourth lower plate to fix the second end portion of the lower spring to the second lower bracket.

10. The spring suspension of claim 1, wherein:

the rubber spring is configured such that a pair of rubber springs is provided to be mounted at opposite sides of the trunnion base, respectively, the first bracket unit is configured such that a pair of first bracket units is provided to be mounted to the rubber springs, respectively, and the composite springs are provided between the first bracket unit and the second bracket unit.

11. The spring suspension of claim 1, wherein:

the composite springs are divided into opposite end portions coupled to the first bracket unit and the second bracket unit, respectively, and a middle portion formed therebetween, and a width of the opposite end portions in a vehicle width direction is smaller than a width of the middle portion in the vehicle width direction.

12. The spring suspension of claim 1, wherein the composite springs are manufactured by impregnating reinforcing fibers with resin.

13. The spring suspension of claim 12, wherein the reinforcing fibers included in an upper spring and a lower spring include a plurality of first fibers arranged perpendicular to the vehicle width direction.

14. The spring suspension of claim 13, wherein the reinforcing fibers included in the lower spring further include a plurality of second fibers arranged to cross the first fibers.

* * * * *